US012739821B2

(12) United States Patent
Zhang et al.

(10) Patent No.: US 12,739,821 B2
(45) Date of Patent: Sep. 15, 2026

(54) UE SOUNDING PROCEDURE BETWEEN COMPONENT CARRIERS

(71) Applicant: QUALCOMM Incorporated, San Diego, CA (US)

(72) Inventors: Yu Zhang, San Diego, CA (US); Alexandros Manolakos, Escondido, CA (US); Peter Gaal, San Diego, CA (US); Muhammad Sayed Khairy Abdelghaffar, San Jose, CA (US); Yi Huang, San Diego, CA (US); Krishna Kiran Mukkavilli, San Diego, CA (US); Wanshi Chen, San Diego, CA (US); Wei Yang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 389 days.

(21) Appl. No.: 17/759,184

(22) PCT Filed: Feb. 21, 2020

(86) PCT No.: PCT/CN2020/076162
§ 371 (c)(1),
(2) Date: Jul. 20, 2022

(87) PCT Pub. No.: WO2021/163993
PCT Pub. Date: Aug. 26, 2021

(65) Prior Publication Data
US 2023/0180219 A1 Jun. 8, 2023

(51) Int. Cl.
*H04W 72/1268* (2023.01)
*H04L 5/00* (2006.01)

(52) U.S. Cl.
CPC ......... *H04W 72/1268* (2013.01); *H04L 5/001* (2013.01); *H04L 5/0044* (2013.01);
(Continued)

(58) Field of Classification Search
CPC .. H04W 72/1268; H04L 5/001; H04L 5/0051; H04L 5/0044; H04L 5/0048; H04L 5/0053
See application file for complete search history.

(56) References Cited

U.S. PATENT DOCUMENTS 10,959,189 B2 * 3/2021 Blankenship ....... H04W 52/146
10,966,157 B2 * 3/2021 Yi ..................... H04W 72/0473
(Continued)

FOREIGN PATENT DOCUMENTS

CN 107743060 A 2/2018
CN 109429360 A 3/2019
(Continued)

OTHER PUBLICATIONS

Supplementary European Search Report—EP20920695—Search Authority—The Hague—Nov. 8, 2023.
(Continued)

*Primary Examiner* — Angela Widhalm de Rodriguez
(74) *Attorney, Agent, or Firm* — Patterson + Sheridan, L.L.P.

(57) ABSTRACT

Certain aspects of the present disclosure provide techniques for handling collisions between PUCCH/PUSCH carrying certain reporting and sounding reference signals (SRS). The techniques provide rules that a user equipment (UE) may apply to decide if and when to drop SRS or PUCCH/PUSCH transmissions scheduled on overlapping time resources in different component carriers.

14 Claims, 10 Drawing Sheets

(52) U.S. Cl.
CPC .......... *H04L 5/0048* (2013.01); *H04L 5/0051* (2013.01); *H04L 5/0053* (2013.01)

(56) References Cited

U.S. PATENT DOCUMENTS

| | | | | |
|---|---|---|---|---|
| 11,601,962 | B2 * | 3/2023 | Baldemair | H04L 1/1854 |
| 12,149,385 | B2 * | 11/2024 | Chatterjee | H04L 5/0044 |
| 12,389,424 | B2 * | 8/2025 | Cirik | H04L 5/0048 |
| 2014/0105130 | A1 | 4/2014 | Noh et al. | |
| 2015/0011236 | A1 | 1/2015 | Kazmi et al. | |
| 2015/0036601 | A1 | 2/2015 | Kim et al. | |
| 2017/0215198 | A1 * | 7/2017 | Chen | H04L 5/005 |
| 2018/0007707 | A1 * | 1/2018 | Rico Alvarino | H04L 12/28 |
| 2019/0044678 | A1 * | 2/2019 | Liu | H04L 5/001 |
| 2019/0149365 | A1 * | 5/2019 | Chatterjee | H04L 25/0226 370/329 |
| 2019/0174466 | A1 * | 6/2019 | Zhang | H04L 5/0057 |
| 2019/0215887 | A1 | 7/2019 | Burbidge et al. | |
| 2019/0281588 | A1 | 9/2019 | Zhang et al. | |
| 2019/0305918 | A1 * | 10/2019 | Siomina | H04L 5/001 |
| 2019/0363843 | A1 * | 11/2019 | Gordaychik | H04W 72/044 |
| 2020/0382250 | A1 * | 12/2020 | Choi | H04L 5/0091 |
| 2020/0403749 | A1 * | 12/2020 | Park | H04L 5/0048 |

FOREIGN PATENT DOCUMENTS

| | | | | |
|---|---|---|---|---|
| CN | 109756619 | A | 5/2019 | |
| WO | 2012036704 | A1 | 3/2012 | |
| WO | 2017132212 | A1 | 8/2017 | |
| WO | 2017223196 | A1 | 12/2017 | |
| WO | 2018230980 | A1 | 12/2018 | |
| WO | WO-2019190236 | A1 * | 10/2019 | H04L 5/0048 |

OTHER PUBLICATIONS

Ericsson, et al., "Configuring or resuming EN-DC in RRC Connection Resume", 3GPP TSG-RAN WG2#105bis, R2-1905353 (Revision of R2-1904491), Xi'an, P.R. China, Apr. 8-12, 2019, 4 Pages, Apr. 12, 2019.

Khoryaev A., et al., "Status Report to TSG", 3GPP TSG RAN Meeting #86, RP-192580, Sitges, Spain, Dec. 9-12, 2019, 32 Pages, Dec. 9, 2019.

OPPO: "Remaining Issues on UL Positioning Reference Signal", 3GPP TSG RAN WG1 #100, R1-2000463, e-Meeting, Feb. 24-Mar. 6, 2020, 4 Pages, Feb. 14, 2020.

Qualcomm Incorporated: "Remaining Details on UL Reference Signals for NR Positioning", 3GPP TSG RAN WG1 #98, 3GPP Draft, R1-1912974, 3rd Generation Partnership Project (3GPP), Mobile Competence Centre, 650, Route Des Lucioles, F-06921 Sophia-Antipolis Cedex, France, vol. RAN WG1, No. Chongqing, China, Pct. 14, 2019-Oct. 18, 2019, 4 Pages, Nov. 9, 2019 (Nov. 9, 2019), XP051823736, Oct. 18, 2019 (Oct. 18, 2019), p. 3, sections 2, 3, 4.

Samsung (Rapporteur): "Introducing WIs Endorsed for ASN. 1 Review of 36.331 REL-15 Second Drop", 3GPP TSG WG2 Meeting #103, Draft R2-1813468, Gothenburg, Sweden, Aug. 20-24, 2018, Aug. 27, 2018, pp. 1-904.

VIVO: "Discussion on Remaining Issues on UL RS for NR Positioning", 3GPP Draft, R1-2000342, 3GPP TSG RAN WG1 #100, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020 (Feb. 15, 2020), XP051853245, 8 Pages, sections 2.1-2.4.

Huawei, et al., "Clarification on SRS Switching Among CCs," 3GPP TSG RAN WG1 Meeting #92, R1-1802075, Feb. 26-Mar. 2, 2018 (Mar. 2, 2018), 4 pages, 2.1 Clarification on some collision handling aspects in 38.214, p. 3, 6.2.1.3 UE sounding procedure between component carriers.

Huawei, et al., "Remaining Issues for SRS Switching Among CCs," 3GPP TSG RAN WG1 Meeting #92bis, R1-1804448, Apr. 16-20, 2018 (Apr. 20, 2018) p. 2, proposal 1, 4 pages.

International Search Report and Written Opinion—PCT/CN2020/076162—ISA/EPO—Nov. 24, 2020.

* cited by examiner 505-a

CU

RRC 510

PDCP 515

DU

RLC 520

MAC 525

PHY 530

505-b

AN

RRC 510

PDCP 515

RLC 520

MAC 525

PHY 530

505-c

UE

RRC 510

PDCP 515

RLC 520

MAC 525

PHY 530

| ID | CC w/o PUSCH/PUCCH | CC w/ PUSCH/PUCCH |
|---|---|---|
| 0 | SRS | PUSCH/PUCCH w/ HARQ-ACK/positive SR/RI/CRI, and/or PRACH |
| 1 | P-/SP SRS | PUSCH w/ A-CSI |
| 2 | SRS | PUCCH/PUSCH w/ P-CSI comprising only CQI/PMI, and/or SRS |
| 3 | A-SRS | PUSCH w/ A-CSI comprising only CQI/PMI |

Note:

- Gray text means the signal/channel is dropped
- Detailed rules in current spec are copied on next slide

FIG. 7

UE SOUNDING PROCEDURE BETWEEN COMPONENT CARRIERS

CROSS-REFERENCE TO RELATED APPLICATIONS

This application is a national stage application under 35 U.S.C. 371 of PCT/CN2020/076162, Feb. 21, 2020, which is hereby expressly incorporated by reference herein in its entirety as if fully set forth below and for all applicable purposes.

INTRODUCTION

Field of the Disclosure

Aspects of the present disclosure relate to wireless communications, and more particularly, to techniques for collision handling for sounding reference signal (SRS) and physical uplink shared channel (PUSCH) transmissions scheduled on different component carriers (CCs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled “Detailed Description” one will understand how the features of this disclosure provide advantages that include improved communications between access points and stations in a wireless network.

Certain aspects provide a method for wireless communications by a user equipment (UE). The method generally includes determining a scheduled sounding reference signal (SRS) transmission on a first component carrier (CC) overlaps with a scheduled report transmission on a second CC associated with at least one of synchronization signal block (SSB), said determination being based beam feedback or physical layer positioning, deciding whether to drop the scheduled SRS transmission or the scheduled report transmission based on the determination, and transmitting the scheduled SRS or the scheduled report based on the decision.

Certain aspects provide a user equipment (UE). The UE generally includes means for determining a scheduled sounding reference signal (SRS) transmission on a first component carrier (CC) overlaps with a scheduled report transmission on a second CC associated with at least one of synchronization signal block (SSB), said determination being based beam feedback or physical layer positioning, means for deciding whether to drop the scheduled SRS transmission or the scheduled report transmission based on the determination, and means for transmitting the scheduled SRS or the scheduled report based on the decision.

Certain aspects provide a user equipment (UE). The UE generally includes a processing system that determines a scheduled sounding reference signal (SRS) transmission on a first component carrier (CC) overlaps with a scheduled report transmission on a second CC associated with at least one of synchronization signal block (SSB), said determination being based beam feedback or physical layer positioning and decides whether to drop the scheduled SRS transmission or the scheduled report transmission based on the determination, and a transmitter that transmits the scheduled SRS or the scheduled report based on the decision.

Certain aspects provide an apparatus for wireless communications by a user equipment (UE). The apparatus generally includes a processing system that determines a scheduled sounding reference signal (SRS) transmission on a first component carrier (CC) overlaps with a scheduled report transmission on a second CC associated with at least one of synchronization signal block (SSB), said determination being based beam feedback or physical layer positioning and decides whether to drop the scheduled SRS transmission or the scheduled report transmission based on the determination, and an interface configured provide the scheduled SRS or the scheduled report for transmission based on the decision.

Certain aspects provide a computer-readable medium for wireless communications. The computer-readable medium generally includes codes executable to determine a scheduled sounding reference signal (SRS) transmission on a first component carrier (CC) overlaps with a scheduled report transmission on a second CC associated with at least one of synchronization signal block (SSB), said determination being based beam feedback or physical layer positioning, decide whether to drop the scheduled SRS transmission or the scheduled report transmission based on the determination, and provide the scheduled SRS or the scheduled report, for transmission, based on the decision.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates example rules for handling collisions between SRS and PUSCH transmissions on overlapping (colliding) resources in different component carriers.

Figure 1:
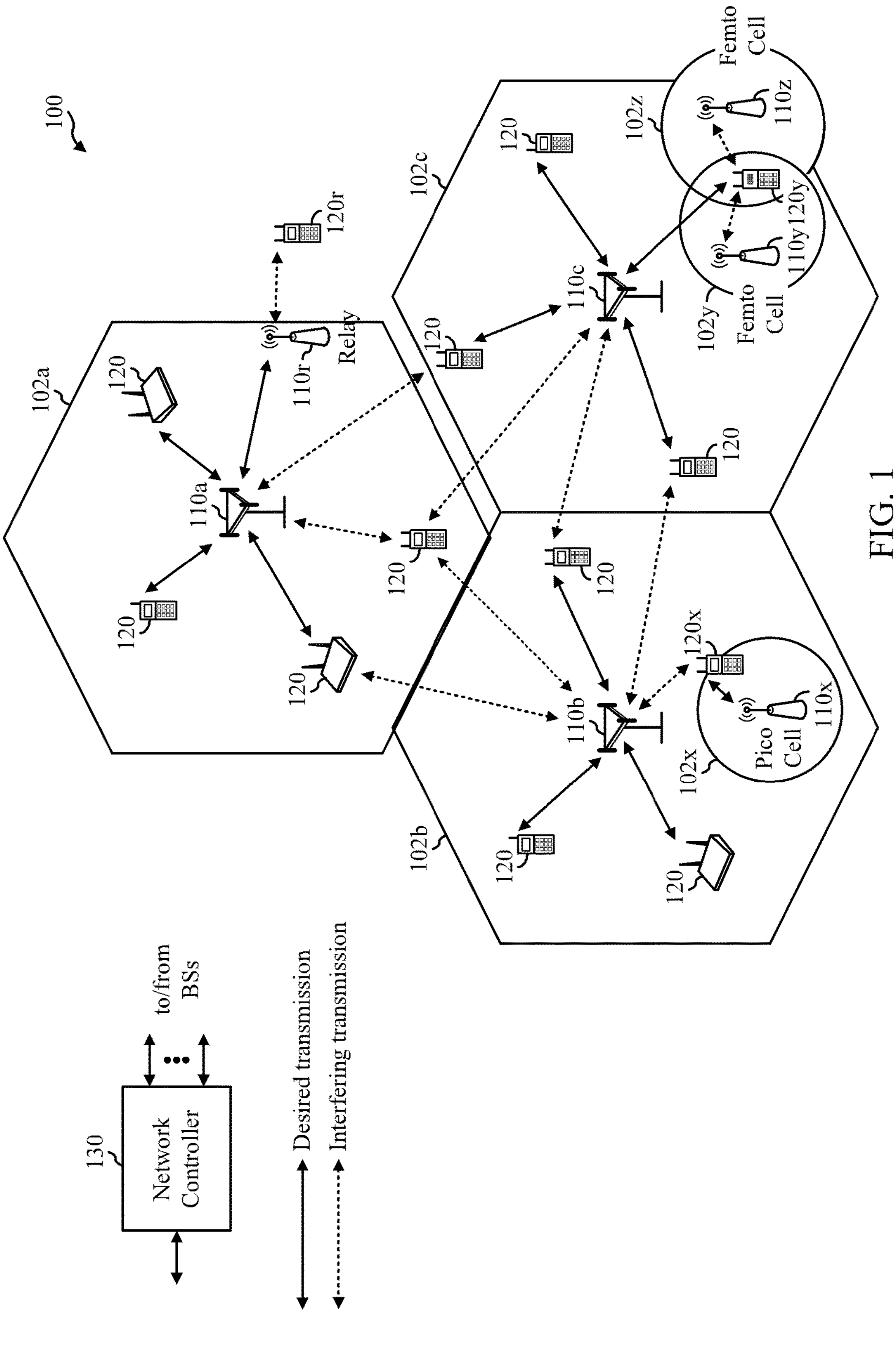
FIG. 1 is a block diagram conceptually illustrating an example telecommunications system, in accordance with certain aspects of the present disclosure.

The APPENDIX includes details of aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to techniques for collision handling for sounding reference signal (SRS) and physical uplink shared channel (PUSCH) transmissions scheduled on different component carriers (CCs) in a same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 may be configured to handle collisions between SRS and PUSCH/PUCCH transmissions using techniques described herein with reference to FIG. 9.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a “resource block” (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
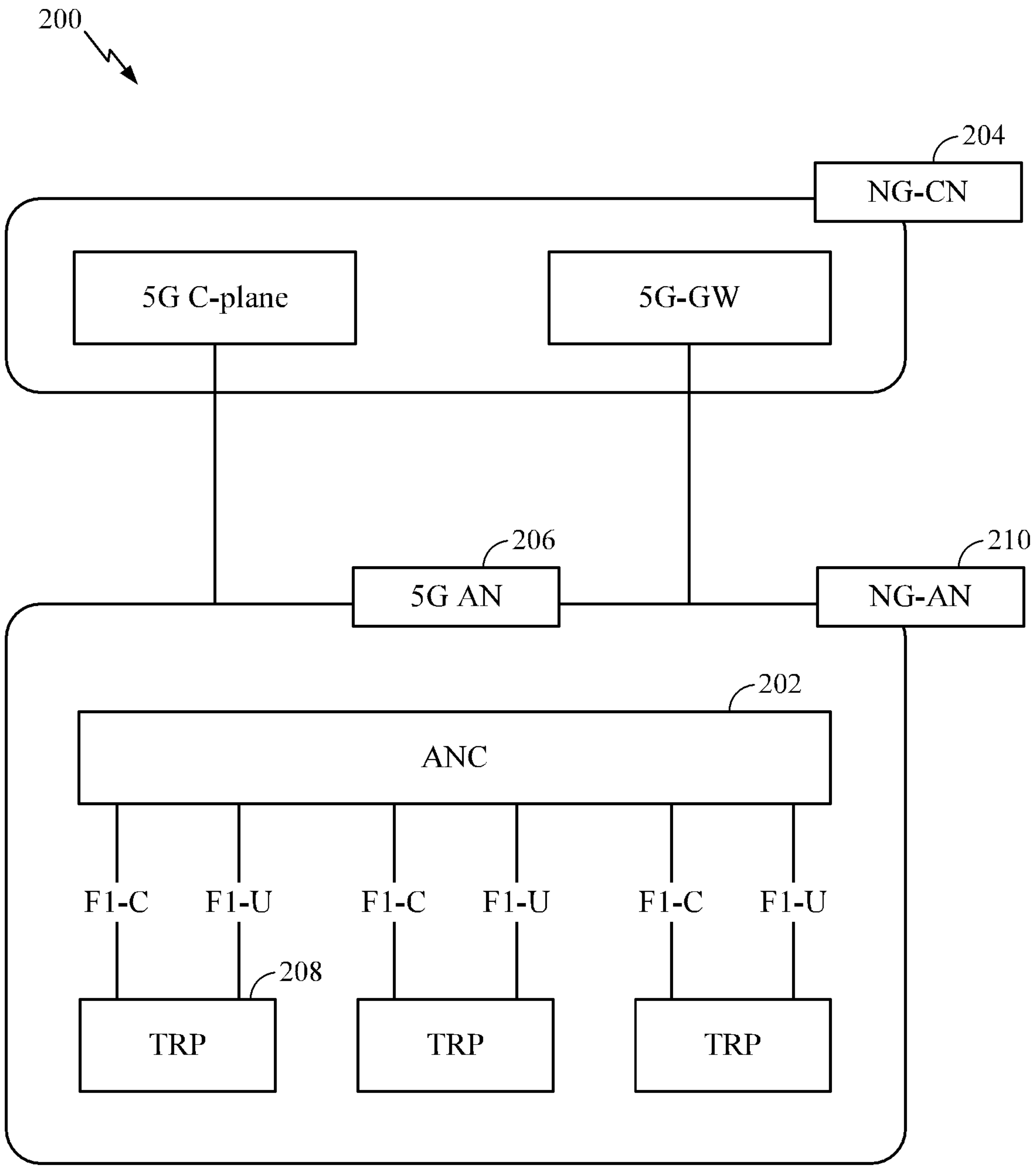
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
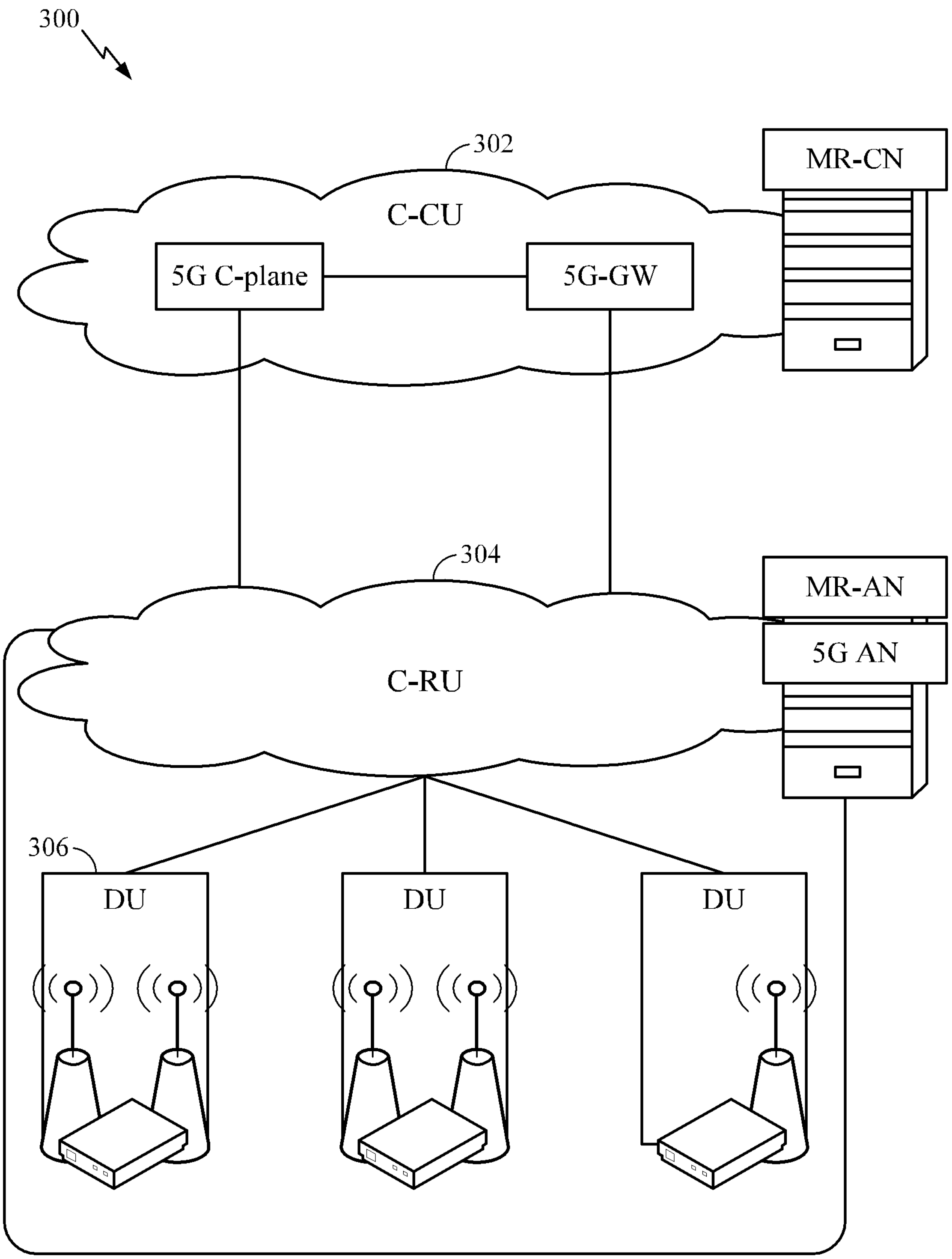
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
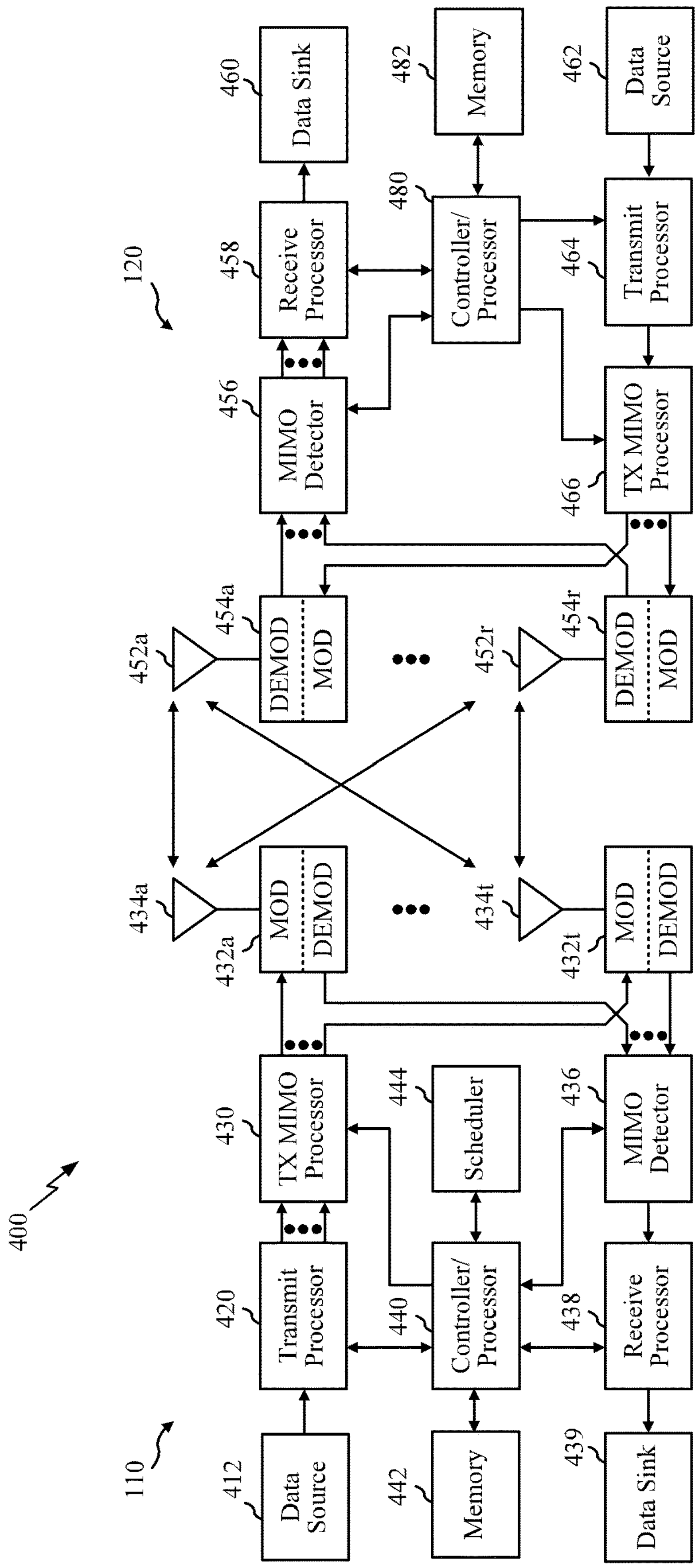
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) transmission from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 480 and/or other processors and modules at the UE 120 may perform or direct the execution of processes for the techniques described herein, for example, with reference to FIG. 9. The memories 442 and 482 may store data and program codes for BS 110 and UE 120, respectively. A scheduler 444 may schedule UEs for data transmission on the downlink and/or uplink.

Figure 5:
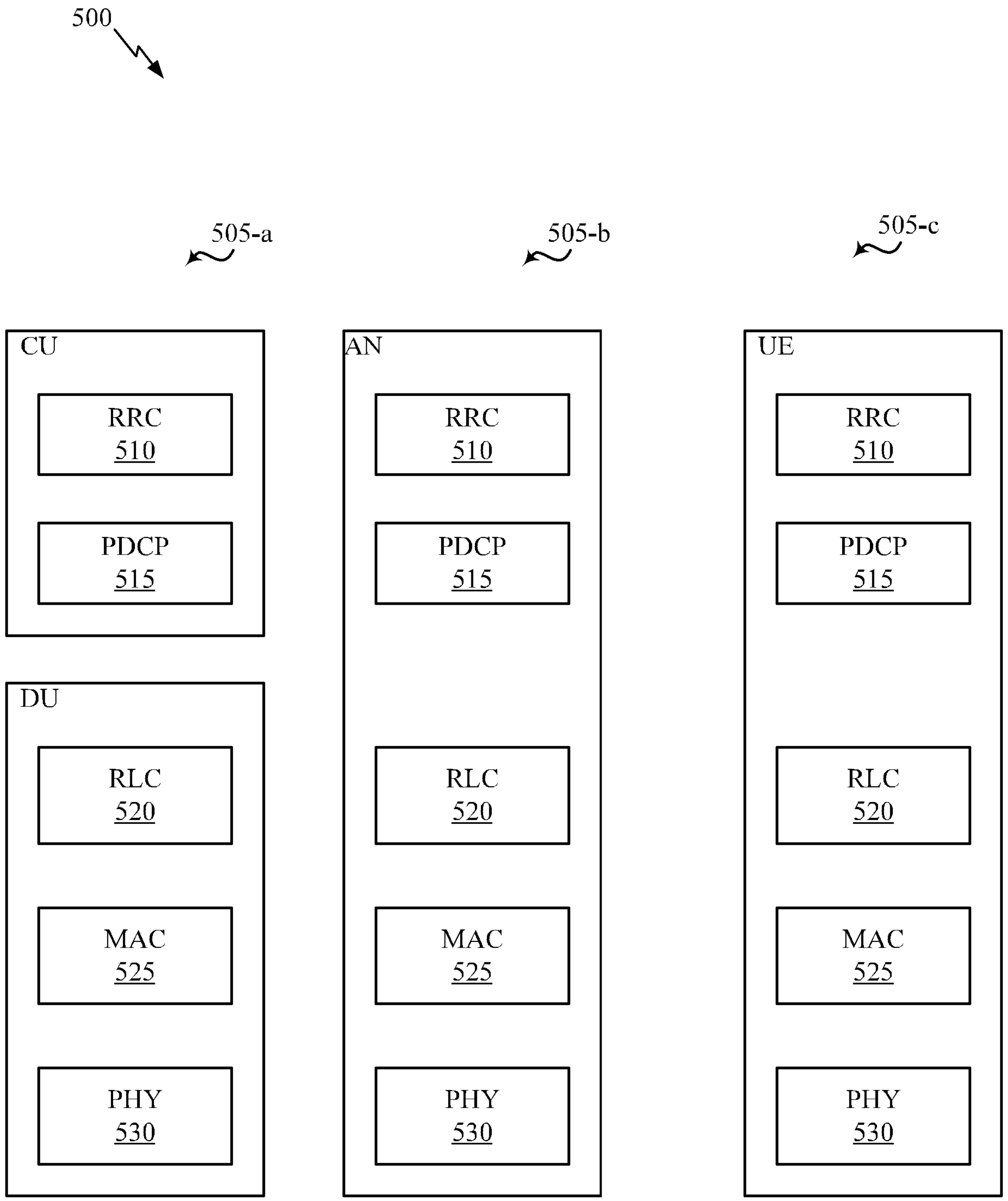
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., a DU such as TRP DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
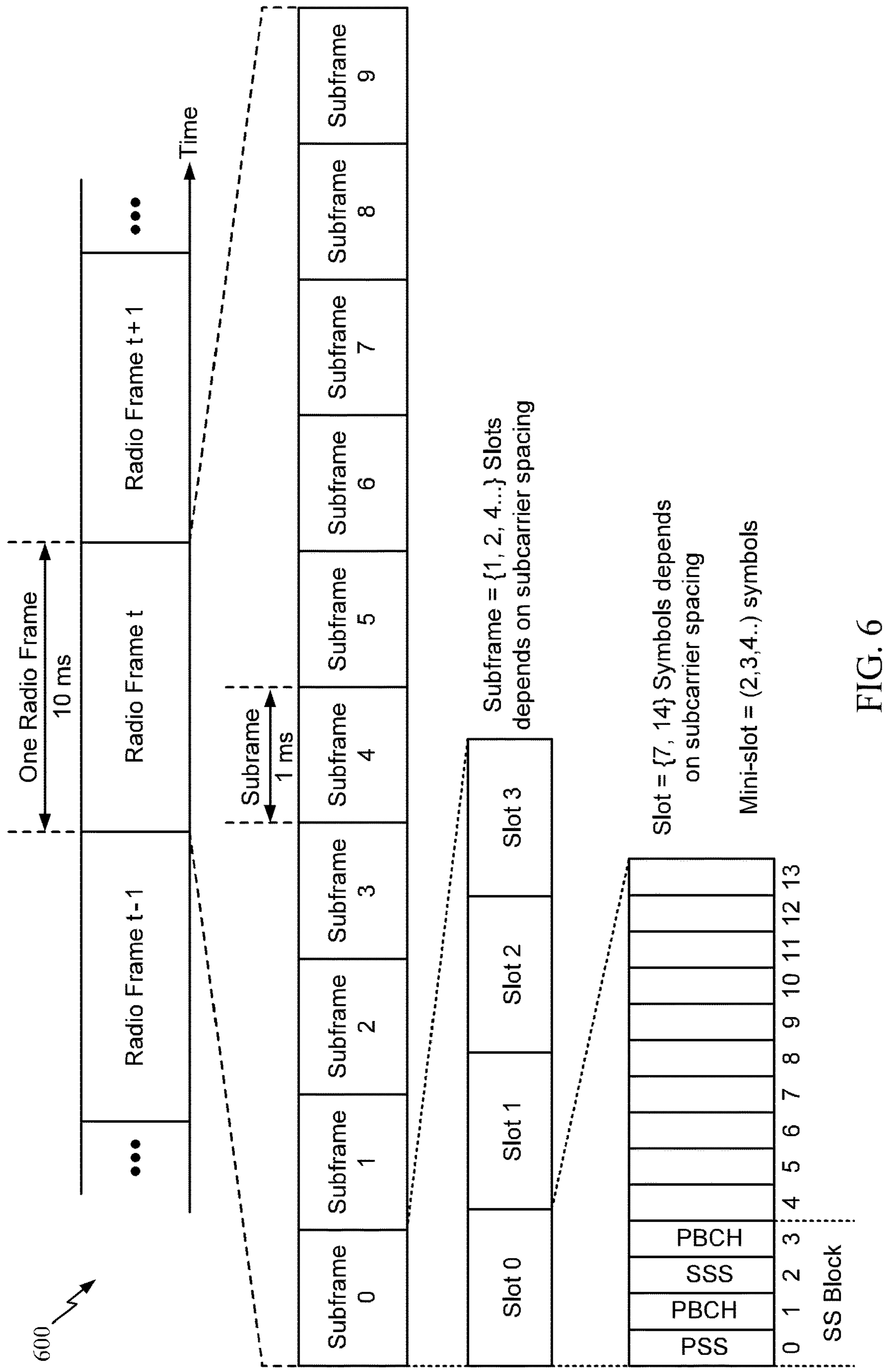
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SRS Transmissions

In wireless communication systems, such as the wireless communication system described above, user equipments (UEs) may transmit sounding reference signals (SRSs) so that the network/base station (e.g., eNBs, gNB, etc.) can measure uplink channel quality. Conventionally, one SRS is transmitted by a UE in a last symbol of a normal uplink (UL) subframe. More recently, additional symbols have been introduced for transmitting SRSs in a normal UL subframe.

These additional SRS symbols may be identified based on a flexible SRS symbol location configuration and/or a virtual cell ID associated with the UE that transmitted the (additional) SRSs. In this context, a "normal subframe" is contrasted with a "special subframe" such as those defined and placed between "normal DL subframes" and "normal UL subframes" that are designed to allow a UE sufficient time to switch between receive and transmit processing.

Increasing SRS capacity by introducing more than one symbol for SRS on an UL normal subframe may be part of an overall support of and advance of coverage enhancements. Increasing SRS capacity may involve introducing more than one symbol for SRS for one UE or for multiple UEs on a UL normal subframe. As a baseline, a minimum SRS resource allocation granularity for a cell may be one slot (e.g., one of two time slots of a subframe) or a subframe, when more than one symbol in a normal subframe is allocated for SRS for the cell. As noted above, a virtual cell ID may be introduced for SRS, allowing different SRS transmissions to be distinguished.

Additionally, in some cases, intra-subframe frequency hopping and repetition may be supported for aperiodic SRS in the additional SRS symbols of a normal uplink subframe. Intra-subframe frequency hopping for aperiodic SRS transmission may involve transmitting aperiodic SRSs on different frequency bands on a symbol-by-symbol basis in a subframe. Additionally, aperiodic SRS repetition may involve repeating transmission of an aperiodic SRS, transmitted in a first additional symbol of a subframe (e.g., using a first antenna, frequency band, etc.), in a second additional symbol of the subframe.

Further, intra-subframe antenna switching may be supported for aperiodic SRS in the additional SRS symbols. Intra-subframe antenna switching for aperiodic SRS transmission may involve transmitting aperiodic SRSs using different antennas on a symbol-by-symbol basis in a subframe.

Both legacy SRS and additional SRS symbol(s) may be configured for the same UE. In some cases, the legacy SRS may be a periodic SRS (P-SRS) or an aperiodic SRS (A-SRS). Additionally, in some cases, the additional SRS may be aperiodically triggered. Currently, a UE may be allowed to transmit periodic legacy SRS and aperiodic additional SRS in the same normal uplink subframe. In the case of aperiodic legacy SRS, a UE may transmit only one of legacy SRS or additional SRS symbol(s) in a normal uplink subframe.

The time location of possible additional SRS symbols in one normal UL subframe for a cell may be selected from various options. According to a first option, all symbols in only one slot of one subframe may be used for SRS from the cell perspective. According to a second option, all symbols in one subframe may be used for SRS from the cell perspective. In some cases, cell-specific configurations of SRS resources in slot-level granularity may be implemented.

Example Collision Handling for SRS and PUSCH/PUCCH Transmissions in CA

Certain systems, such as NR, support SRS (NR-SRS) resources that span 1, 2, 4 adjacent symbols with up to 4 ports per SRS resource. All ports of an SRS resource are typically sounded in each symbol. Typically, an SRS can only be transmitted in the last 6 symbols of a slot and an SRS can only be transmitted after the PUSCH in that slot.

An SRS resource set contains a sets of SRS resources transmitted by one UE. An SRS resource set may be transmitted aperiodic (e.g., triggered via DCI signaling), semi-persistent, or periodic.

In some cases, a UE may be configured with multiple resources, which may be grouped in a SRS resource set depending on the use case. Examples of different use cases include antenna switching, codebook-based transmission, non-codebook based transmission, beam management, and the like.

SRS transmission may be wideband or subband-based. SRS bandwidths may have a fixed resolution. For example, configured SRS bandwidths may be multiples of 4 PRBs.

In carrier aggregation (CA) scenarios, due to the flexibility of the time location(s) of possible SRS symbols, the possibility exists that SRS transmissions in one component carrier (CC1) may overlap (collide) in the time domain with PUCCH/PUSCH transmissions in another CC (CC2). There are different options for handling such collisions in conventional systems.

For example, FIG. 7 illustrates example rules for a UE sounding procedure between component carriers. The examples in FIG. 7 may be considered a set of rules are defined to resolve the collision of the SRS on a PUSCH/PUCCH-less CC and UL signals/channels on another CC. In other words, the rules in FIG. 7, may determine when a UE may transmit SRS on a PUSCH/PUCCH-less CC by interrupting the transmission on another CC.

As shown in FIG. 7, for a carrier of a serving cell with slot formats not configured for PUSCH/PUCCH transmission, the UE may be configured to: drop SRS transmissions scheduled on the carrier of the serving cell and a PUSCH/PUCCH transmission on another carrier carrying HARQ-ACK/positive SR/RI/CRI and/or PRACH that overlaps in time; drop a periodic/semi-persistent SRS whenever periodic/semi-persistent SRS transmission on the carrier of the serving cell and PUSCH transmission carrying aperiodic CSI on another carrier that overlaps in the same symbol; drop PUCCH/PUSCH transmission carrying periodic CSI comprising only CQI/PMI, and/or SRS transmission on another serving cell configured for PUSCH/PUCCH transmission whenever the transmission and SRS transmission on the serving cell overlaps in the same symbol; and/or drop a PUSCH transmission carrying aperiodic CSI comprising only CQI/PMI whenever the transmission and aperiodic SRS transmission on the carrier of the serving cell overlaps in the same symbol.

Unfortunately, not all of the potential collision cases are fully covered by current rules. For example, one undefined collision case is how to handle a collision between SRS transmissions and certain types of reports carried on PUSCH/PUCCH. For example, collision handling is undefined for a collision between periodic SRS and periodic SSB-based beam reporting w/o HARQ-ACK or for a collision between aperiodic SRS and aperiodic SSB-based beam reporting. SSB-based beam reporting may include one or more of SS/PBCH resource block indicator (SSBRI), reference signal received power, or SSBRI/SINR.

Aspects of the present disclosure provide techniques that may help UEs handle collisions of SRS and PUSCH/PUCCH transmissions carrying SSB-based beam reporting and/or position information. As will be described in greater detail below, the techniques presented herein may give priority to SSB-based beam reporting and/or certain types of position information reporting scheduled on one CC, deciding to drop an SRS transmission scheduled on overlapping time resources on another CC.

Figure 8:
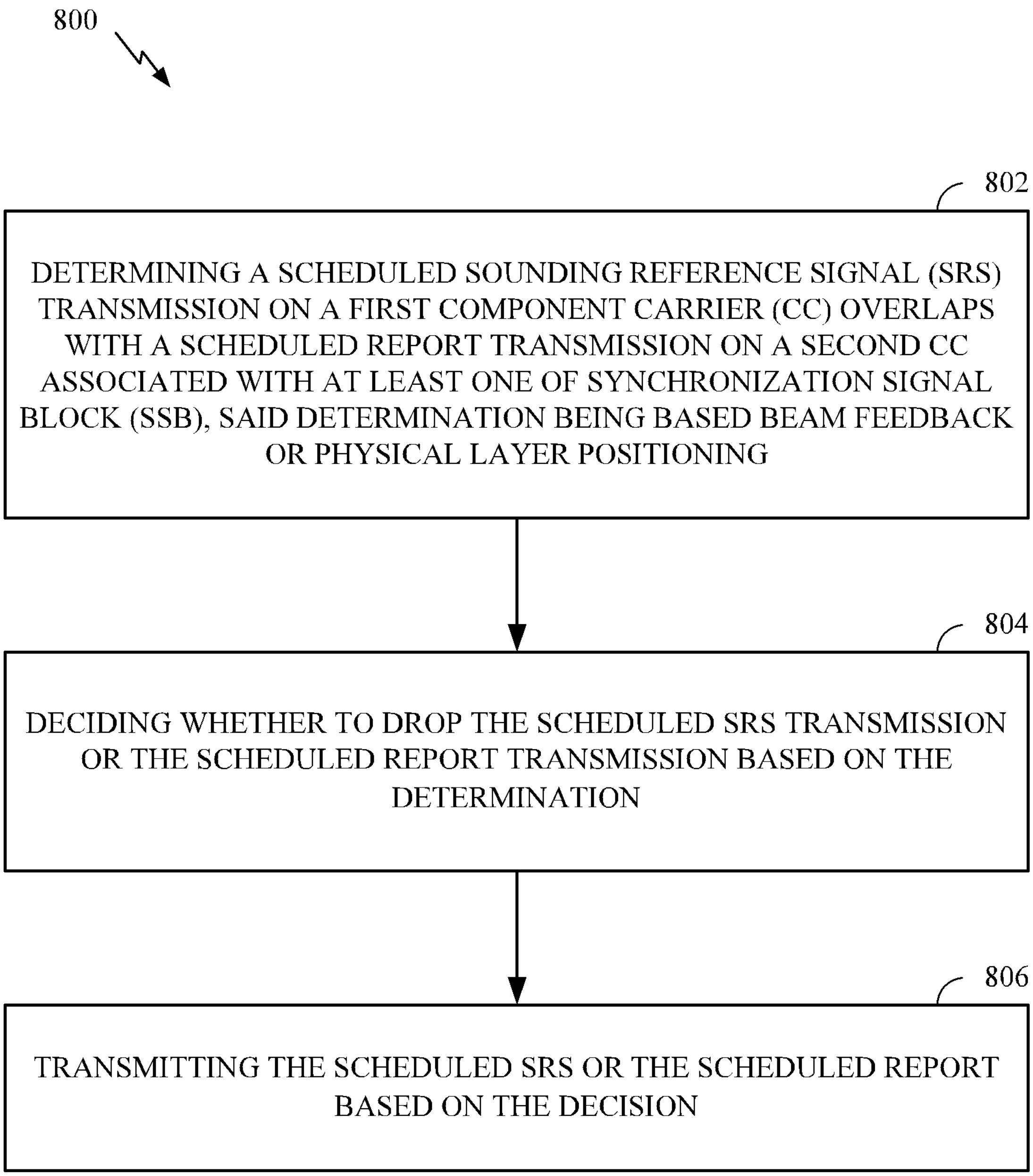
FIG. 8 illustrates example operations for wireless communications by a user equipment, in accordance with certain aspects of the present disclosure.

FIG. 8 illustrates example operations 800 for wireless communications by a network entity. For example, operations 800 may be performed by a UE to be configured and transmit (or drop) SRS in accordance with aspects of the present disclosure. Operations 800 may be performed, for example, by UE 120 shown in FIG. 1 or FIG. 4.

Operations 800 begin, at 802, by determining a scheduled sounding reference signal (SRS) transmission on a first component carrier (CC) overlaps with a scheduled report on a second CC for at least one of synchronization signal block (SSB) based beam feedback or physical layer positioning.

At 804, the UE decides whether to drop the scheduled SRS transmission or the scheduled report. At 806, the UE transmits the scheduled SRS or the scheduled report based on the decision.

Figure 9:
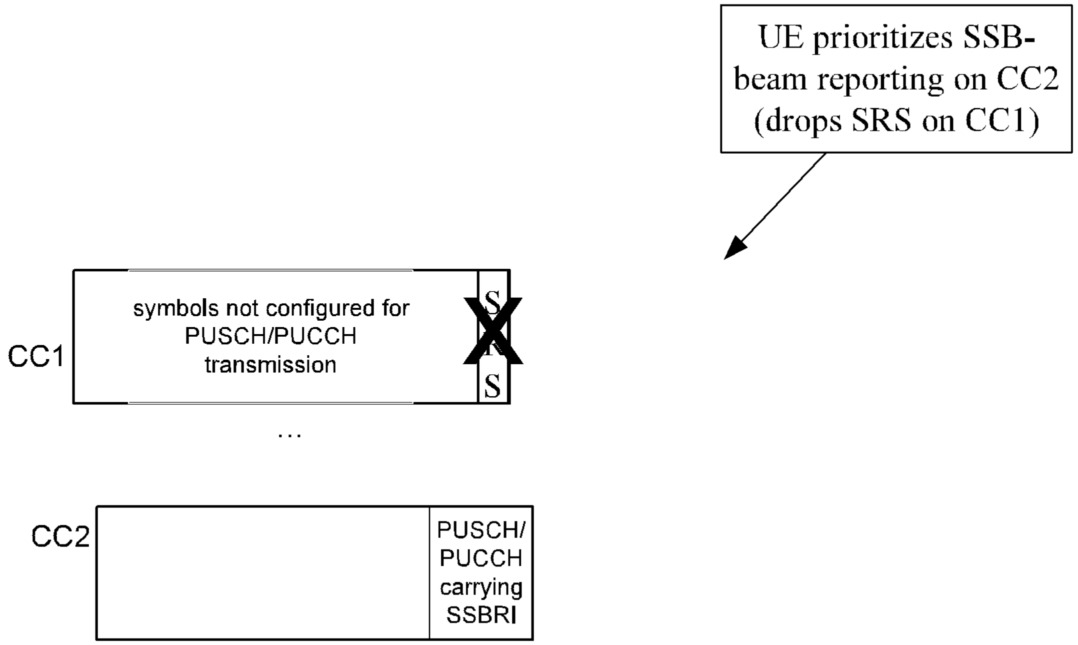
FIG. 9 illustrates example an example of handling a collision between SRS and SSB-based beam reporting transmissions on overlapping time resources in different component carriers.

In some cases, SSB-based beam reporting on one CC may be given a higher priority than an overlapping SRS transmission on another CC. Application of this rule is illustrated in FIG. 9. As illustrated, a UE may prioritizes SSB-beam reporting on CC2 by dropping SRS on CC1.

This rule to prioritize SSB-based beam reporting may be summarized as: for a carrier of a serving cell with slot formats not configured for PUSCH/PUCCH transmission, the UE may be configured to: drop SRS transmissions scheduled on the carrier of the serving cell and a PUSCH/PUCCH transmission on another carrier carrying HARQ-ACK/positive SR/RI/CRI/SSBRI and/or PRACH that overlaps in time.

In conventional systems (e.g., Rel-16), positioning measurements and/or estimates are reported via layer 3 (L3) signaling. For example, UE Rx-Tx, DL reference signal time difference (RSTD), positioning reference signal RSRP (PRS-RSRP), quality metrics for positioning, and the like may be reported.

Unfortunately, one L3 positioning report may not be able to meet a target latency of 10 ms for some services, such as virtual reality/extended reality (VR/XR). In future releases, some positioning measurements/estimates may be reported in L1 to achieve more aggressive target latencies.

For example, positing information may be multiplexed with UL-SCH/UCI and carried by periodic/semi-persistent/aperiodic PUCCH/PUSCH. As used herein, a positioning measurement generally refers to a raw physical measurement, while positioning estimate generally refers to an outcome of the processing of several measurements. As such, it may be desirable in some cases to give a positioning estimate higher priority than SRS, while positioning measurements may have lower priority.

According to certain aspects of the present disclosure, L1 (PHY) positioning reporting on one CC may be given a higher priority than an overlapping SRS transmission on another CC, in scenarios where a UE supports L1 positioning measurements and/or estimates.

In some cases, dropping rules may be determined based on quantities in the positioning report. For example, a UE may drop SRS and transmit the PUCCH/PUSCH with some positioning measurement/estimate quantities.

Figure 10A:
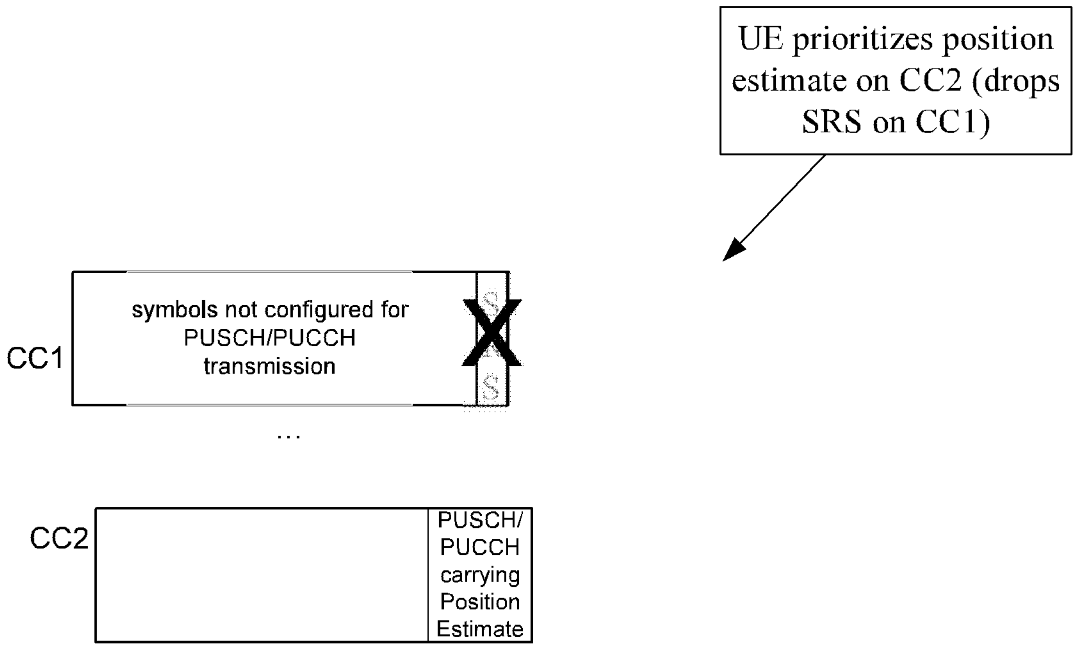
FIGS. 10A and 10B illustrate examples of handling collisions between SRS and position reporting transmissions on overlapping time resources in different component carriers.
Figure 10B:
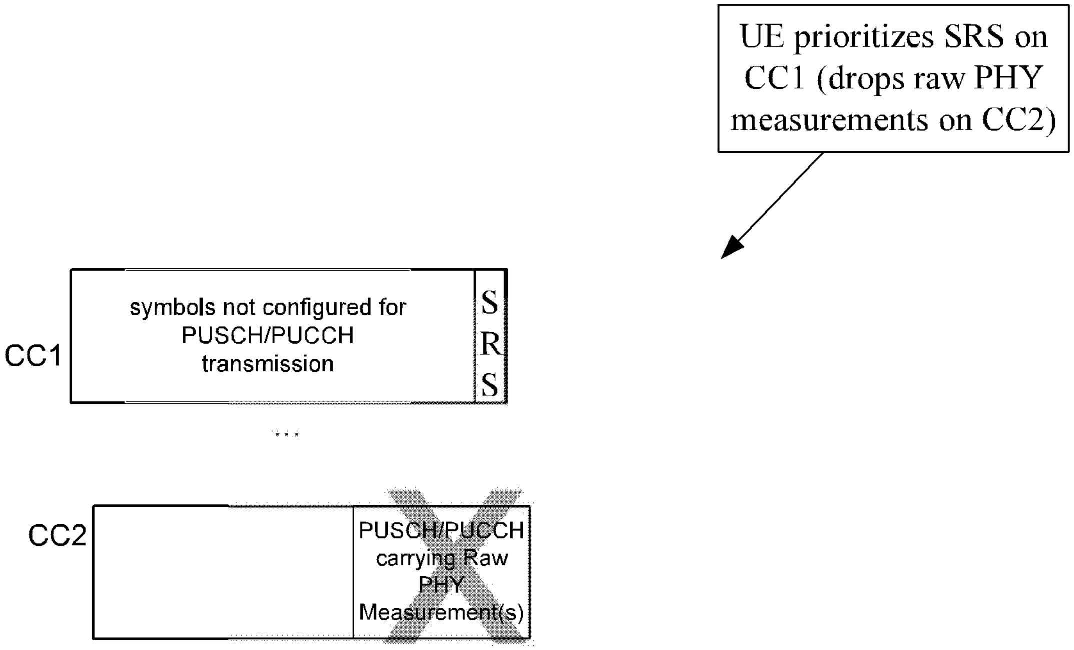

As shown in FIG. 10A, if the UE reports a positioning estimate in a PUCCH/PUSCH, it may have higher priority than SRS, so the UE may drop SRS. On the other hand, as shown in FIG. 10B, if the UE is reporting just raw PHY measurements (RSTD, RSRP, Rx-Tx, Quality metrics), the raw PHY measurements may have lower priority than the SRS, so the UE may drop the raw PHY measurements.

In some cases, dropping rules may depend on the signals on which the positioning report is based on. For example, a positioning report based on DL PRS may have higher priority, such that SRS may be dropped if it overlaps with a PUCCH/PUSCH with positioning measurements/estimates based on DL PRS.

In some cases, dropping rules may depend on time-domain behavior of the SRS. For example, aperiodic SRS may have higher priority when the PUCCH/PUSCH only carries some positioning measurement/estimation quantities. For example, in case of A-SRS overlapping with PUCCH/PUSCH only carrying DL RSTD, the PUCCH/PUSCH may be dropped.

In some cases, dropping rules may depend on time-domain behavior of the positioning reports. For example, aperiodic positioning report may have higher priority than SRS.

In some cases, dropping rules may depend on usage of the SRS. For example, SRS for positioning may have higher priority than SRS for other usages. In some cases, if SRS for positioning (PUSCH/PUCCH-less CC) overlaps with SRS for beam management, SRS for positioning may be dropped.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, various operations shown in FIGS. 9 and 10 may be performed by various processors shown in FIG. 4. More particularly, operations 1000 of FIG. 10 may be performed by processors 420, 460, 438, and/or controller/processor 440 of the BS 110 shown in FIG. 4 while operations 900 of FIG. 9 may be performed by one or more of processors 466, 458, 464, and/or controller/processor 480 of the UE 120.

Means for receiving may include a receiver (such as one or more antennas or receive processors) illustrated in FIG. 4. Means for transmitting may include a transmitter (such as one or more antennas or transmit processors) illustrated in FIG. 4. Means for determining and means for deciding may include a processing system, which may include one or more processors, such as processors 466, 458, 464, and/or controller/processor 480 of the UE 120 and/or processors 420, 460, 438, and/or controller/processor 440 of the BS 110 shown in FIG. 4. In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

APPENDIX: SRS Carrier Switching Rules

Background

Quick outline of NR SRS (Rel-15 & 16)

- NR supports NR SRS resources that span 1,2,4 adjacent symbols with up to 4 ports per SRS resource
  - All ports of an SRS resource are sounded in each symbol
  - An SRS can only be transmitted in the last 6 symbols of a slot
  - An SRS can only be transmitted after the PUSCH in that slot
- An SRS resource set contains a sets of SRS resources transmitted by one UE
  - An SRS resource set may be transmitted aperiodic (DCI-signaled), semi-persistent, periodic
  - A UE may be configured with multiple resources, which may be grouped in a SRS resource set depending on the use case (antenna switching, codebook-based, non-codebook based, beam management)
- SRS transmission may be wideband/subband
  - SRS bandwidth are multiple of 4 PRBs

Background

SRS carrier switching in current spec (Rel-15 & 16)

- UE sounding procedure between component carriers (Sec. 6.2.1.3 in 38.214)
  - A UE may transmit SRS on a PUSCH/PUCCH-less CC by interrupting the transmission on another CC
  - A set of rules are defined to resolve the collision of the SRS on a PUSCH/PUCCH-less CC and UL signals/channels on another CC

| ID | CC w/o PUSCH/PUCCH | CC w/ PUSCH/PUCCH |
|---|---|---|
| 0 | SRS (dropped) | PUSCH/PUCCH w/ HARQ-ACK/positive SR/RI/CRI, and/or PRACH |
| 1 | P-/SP SRS (dropped) | PUSCH w/ A-CSI |
| 2 | SRS | PUCCH/PUSCH w/ P-CSI comprising only CQI/PMI, and/or SRS (dropped) |
| 3 | A-SRS | PUSCH w/ A-CSI comprising only CQI/PMI (dropped) |

Note:

- (dropped) identifies the signal/channel that is dropped
- Detailed rules in current spec are copied on next slide

Background

Collision handling rules for SRS carrier switching in TS38.214 (1/2)

- *For a carrier of a serving cell with slot formats comprised of DL and UL symbols, not configured for PUSCH/PUCCH transmission, the UE shall not transmit SRS whenever SRS transmission (including any interruption due to uplink or downlink RF retuning time [11, TS 38.133] as defined by higher layer parameters switchingTimeUL and switchingTimeDL of srs-SwitchingTimeNR) on the carrier of the serving cell and PUSCH/PUCCH transmission carrying HARQ-ACK/positive SR/RI/CRI and/or PRACH happen to overlap in the same symbol and that can result in uplink transmissions beyond the UE's indicated uplink carrier aggregation capability included in [13, TS 38.306].*
- *For a carrier of a serving cell with slot formats comprised of DL and UL symbols, not configured for PUSCH/PUCCH transmission, the UE shall not transmit a periodic/semi-persistent SRS whenever periodic/semi-persistent SRS transmission (including any interruption due to uplink or downlink RF retuning time [11, TS 38.133] as defined by higher layer parameters switchingTimeUL and switchingTimeDL of srs-SwitchingTimeNR) on the carrier of the serving cell and PUSCH transmission carrying aperiodic CSI happen to overlap in the same symbol and that can result in uplink transmissions beyond the UE's indicated uplink carrier aggregation capability included in [13, TS 38.306].*

Background

Collision handling rules for SRS carrier switching in TS38.214 (2/2)

- *For a carrier of a serving cell with slot formats comprised of DL and UL symbols, not configured for PUSCH/PUCCH transmission, the UE shall drop PUCCH/PUSCH transmission carrying periodic CSI comprising only CQI/PMI, and/or SRS transmission on another serving cell configured for PUSCH/PUCCH transmission whenever the transmission and SRS transmission (including any interruption due to uplink or downlink RF retuning time [11, TS 38.133] as defined by higher layer parameters switchingTimeUL and switchingTimeDL of srs-SwitchingTimeNR) on the serving cell happen to overlap in the same symbol and that can result in uplink transmissions beyond the UE's indicated uplink carrier aggregation capability included in [13, TS 38.306].*
- *For a carrier of a serving cell with slot formats comprised of DL and UL symbols, not configured for PUSCH/PUCCH transmission, the UE shall drop PUSCH transmission carrying aperiodic CSI comprising only CQI/PMI whenever the transmission and aperiodic SRS transmission (including any interruption due to uplink or downlink RF retuning time [11, TS 38.133]) as defined by higher layer parameters switchingTimeUL and switchingTimeDL of srs-SwitchingTimeNR) on the carrier of the serving cell happen to overlap in the same symbol and that can result in uplink transmissions beyond the UE's indicated uplink carrier aggregation capability included in [13, TS 38.306].*

Issue 1

Not all the collision cases are fully covered by the rules in current spec

- Undefined collision cases in Rel-15 & 16
  - Periodic SRS vs. periodic SSB-based beam reporting w/o HARQ-ACK
  - Aperiodic SRS vs. aperiodic SSB-based beam reporting

| ID | CC w/o PUSCH/PUCCH | CC w/ PUSCH/PUCCH |
|---|---|---|
| 0 | SRS (dropped) | PUSCH/PUCCH w/ HARQ-ACK/positive SR/RI/CRI, and/or PRACH |
| 1 | P-/SP SRS (dropped) | PUSCH w/ A-CSI |
| 2 | SRS | PUCCH/PUSCH w/ P-CSI comprising only CQI/PMI, and/or SRS (dropped) |
| 3 | A-SRS | PUSCH w/ A-CSI comprising only CQI/PMI (dropped) |

- Note: SSB-based beam reporting including
  - SSBRI/RSRP, or
  - SSBRI/SINR

Proposal

SRS vs. SSB-based beam reporting

- SSB-based beam reporting has higher priority
  - *For a carrier of a serving cell with slot formats comprised of DL and UL symbols, not configured for PUSCH/PUCCH transmission, the UE shall not transmit SRS whenever SRS transmission (including any interruption due to uplink or downlink RF retuning time [11, TS 38.133] as defined by higher layer parameters switchingTimeUL and switchingTimeDL of srs-SwitchingTimeNR) on the carrier of the serving cell and PUSCH/PUCCH transmission carrying HARQ-ACK/positive SR/RI/CRI/SSBRI happen to overlap in the same symbol and that can result in uplink transmissions beyond the UE's indicated uplink carrier aggregation capability included in [13, TS 38.306].*

Issue 2

SRS vs. L1 positioning reporting

- New collision rules are needed if L1 reporting for some positioning measurements/estimates is supported
  - In Rel-16, L1 positioning reporting was discussed, but it's not agreed
  - In Rel-16, positioning measurements/estimates are reported in L3
    - E.g., UE Rx-Tx, DL RSTD, PRS-RSRP, quality metrics for positioning, etc.
    - L3 positioning report may not be able to meet a target latency of 10ms for some services (e.g., VR/XR)
  - In future releases, some positioning measurements/estimates may be reported in L1
    - Multiplexed with UL-SCH/UCI
    - Carried by periodic/semi-persistent/aperiodic PUCCH/PUSCH
    - Note: "positioning measurement" vs. "positioning estimate"
      - A positioning estimate is not really a positioning measurement, it is the outcome of the processing of several measurements
      - "Positioning estimate" may have higher priority than SRS, while "positioning measurement" may have lower priority

Proposal

SRS vs. L1 positioning reporting

- Dropping rules are determined by one or more following aspects (1/2)
  - Quantities in the positioning report
    - UE may drop SRS and transmit the PUCCH/PUSCH with some positioning measurement/estimate quantities
      - If the UE reports positioning estimate in a PUCCH/PUSCH, it would have higher priority than SRS, whereas if the UE is reporting just raw PHY measurements (RSTD, RSRP, Rx-Tx, Quality metrics) it would have lower priority than the SRS
  - Signals on which the positioning report is based on
    - Positioning report based on DL PRS has higher priority, e.g., SRS vs PUCCH/PUSCH with positioning measurements/estimates based on DL PRS, SRS is dropped
  - Time-domain behavior of the SRS
    - Aperiodic SRS may have higher priority when the PUCCH/PUSCH only carries some positioning measurement/estimation quantities, e.g., in case of A-SRS vs. PUCCH/PUSCH only comprising DL RSTD, the PUCCH/PUSCH is dropped
  - Time domain behavior of the positioning reports
    - Aperiodic positioning report may have higher priority, e.g., SRS vs. aperiodic positioning report, SRS is dropped

Proposal

SRS vs. L1 positioning reporting

- Dropping rules are determined by one or more following aspects (2/2)
  - Usage of the SRS
    - SRS for positioning has higher priority than SRS for other usages, e.g., SRS for positioning (PUSCH/PUCCH-less CC) vs. SRS for beam management, SRS for positioning is dropped

What is claimed is:

1. A method of wireless communication performed by a user equipment (UE), comprising:

determining a sounding reference signal (SRS) transmission scheduled on a first component carrier (CC) overlaps with a report transmission scheduled on a second CC, wherein the report transmission comprises a synchronization signal block (SSB)-based beam report;

deciding to drop the SRS transmission based on the determination; and transmitting the report transmission based on the decision.

2. The method of claim 1, wherein the SRS transmission is scheduled on the first CC without a scheduled physical uplink control channel (PUCCH) transmission or a physical uplink shared channel (PUSCH) transmission.

3. The method of claim 1, wherein:

the SRS transmission comprises a periodic SRS; and the SSB-based beam report comprises a periodic SSB-based beam report without acknowledgment feedback.

4. The method of claim 1, wherein:

the SRS transmission comprises an aperiodic SRS; and the SSB-based beam report comprises an aperiodic SSB-based beam report.

5. The method of claim 1, wherein the decision to drop is based, at least in part, on a time-domain behavior of the SRS transmission.

6. The method of claim 1, wherein the decision to drop is based, at least in part, on a usage of the SRS transmission.

7. The method of claim 6, wherein the decision to drop is based, at least in part, on the SRS transmission being for a non-positioning use.

8. A user equipment (UE), comprising:

a processing system configured to:

determine a sounding reference signal (SRS) transmission scheduled on a first component carrier (CC) overlaps with a report transmission scheduled on a second CC, wherein the report transmission comprises a synchronization signal block (SSB)-based beam report scheduled for transmission, decide to drop the SRS transmission based on the determination; and transmit the report transmission based on the decision.

9. The UE of claim 8, wherein the SRS transmission is scheduled on the first CC without a scheduled physical uplink control channel (PUCCH) transmission or a physical uplink shared channel (PUSCH) transmission.

10. The UE of claim 8, wherein:

the SRS transmission comprises a periodic SRS; and the SSB-based beam report comprises a periodic SSB-based beam report without acknowledgment feedback.

11. The UE of claim 8, wherein:

the SRS transmission comprises an aperiodic SRS; and the SSB-based beam report comprises an aperiodic SSB-based beam report.

12. The UE of claim 8, wherein the decision to drop is based, at least in part, on a time-domain behavior of the SRS transmission.

13. The UE of claim 8, wherein the decision to drop is based, at least in part, on a usage of the SRS transmission.

14. The UE of claim 13, wherein the decision to drop is based, at least in part, on the SRS transmission being for a non-positioning use.

* * * * *